Patented Oct. 6, 1931

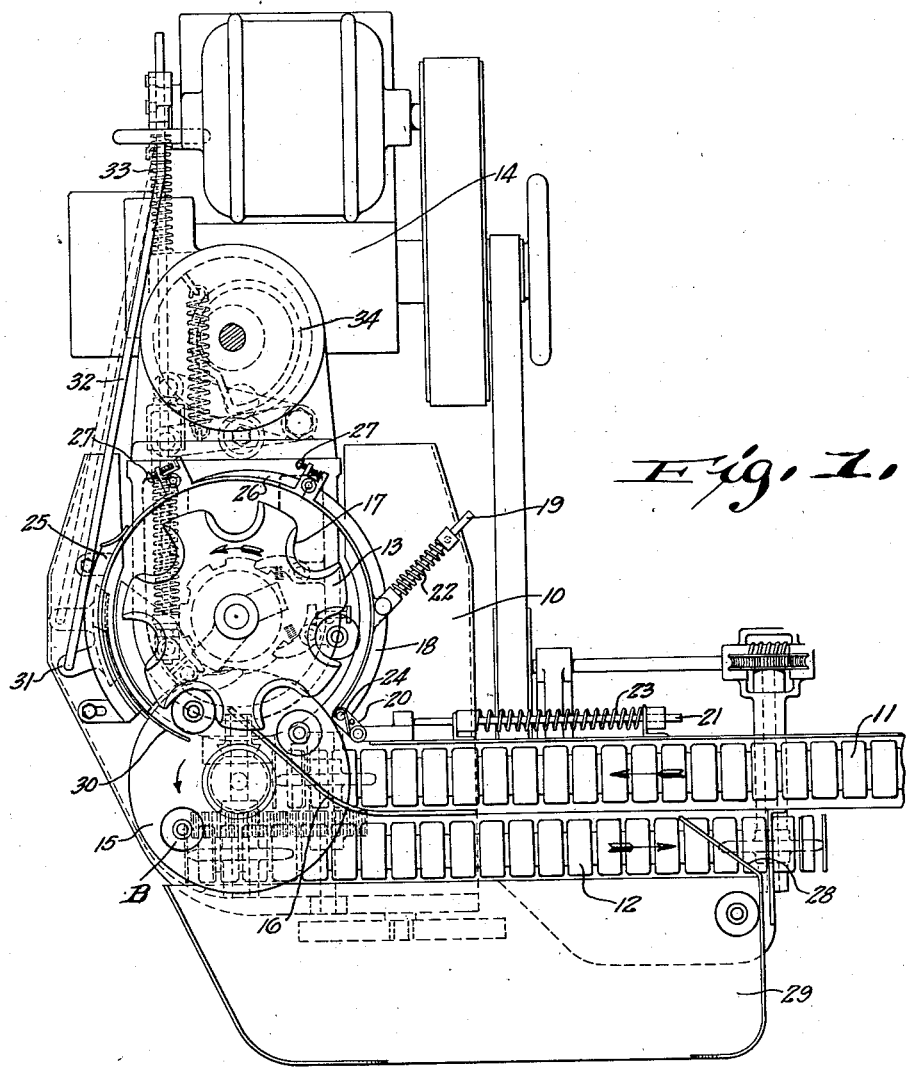
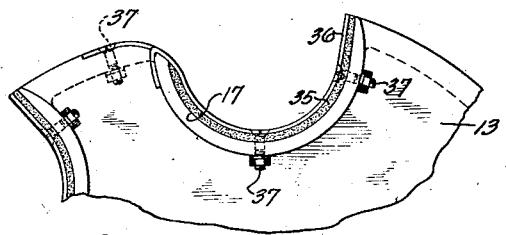

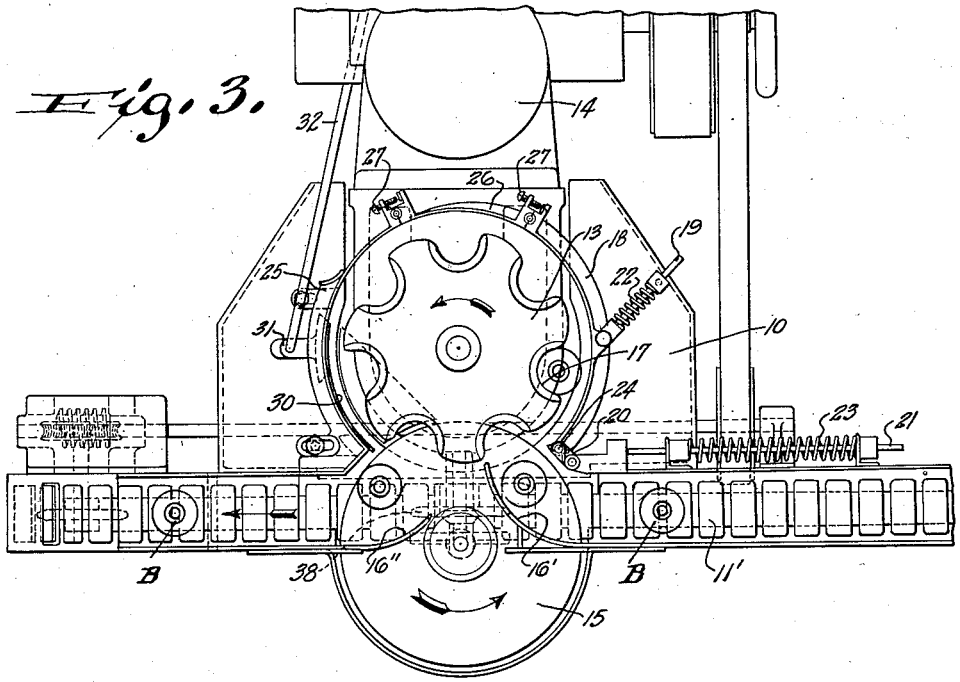
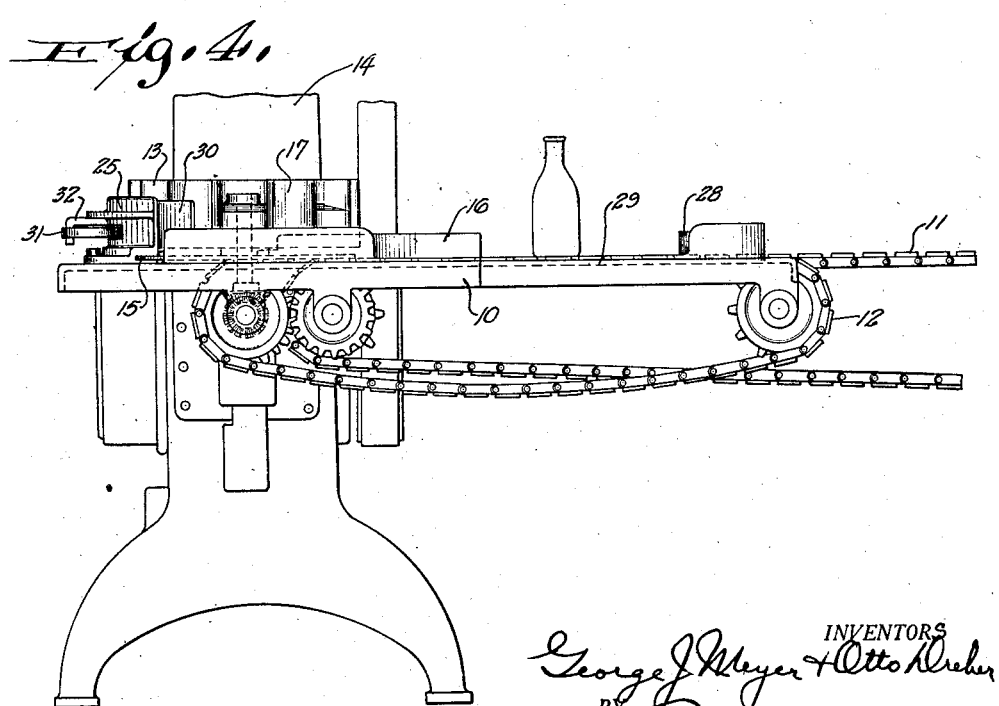

1,825,751

UNITED STATES PATENT OFFICE

GEORGE J. MEYER AND OTTO DREHER, OF MILWAUKEE, WISCONSIN, ASSIGNORS TO GEO. J. MEYER MANUFACTURING COMPANY, OF MILWAUKEE, WISCONSIN, A CORPORATION OF WISCONSIN

BOTTLE FEEDER

Application filed November 6, 1926. Serial No. 146,647.

The invention relates to bottle feeders, more particularly for use with bottle fillers and cappers.

An object of the invention is to provide an automatic feeder by which bottles are transferred from a conveyor to a rotating carrier and vice versa, by means including a rotary feeding disk cooperating with the conveyor, thereby insuring accurate and positive feeding of the bottles and permitting the feeding of a single bottle at the end of a run without manual attention.

Another object of the invention is to provide a bottle feeder of this type in which the bottles are fed to and discharged from the rotating carrier by means of the same rotary feeding member.

A further object of the invention is to provide a shiftable bottle guard cooperating with an intermittently rotating carrier whereby the discharge of bottles is permitted without danger of upsetting or breakage.

A further object is to provide a star wheel carrier having bottle-receiving notches equipped with resilient buffers to avoid breakage or chipping of bottles.

A further object is to provide a star wheel carrier in which the peripheral notches are lined with resilient material covered with thin sheet metal to resist abrasion.

A further object is to effect improvements on the type of machine shown in our earlier filed joint application with Peter J. Shodron, which has resulted in Patent No. 1,761,223, dated June 3, 1930.

The invention further consists in the several features hereinafter set forth and more particularly defined by the annexed claims.

In the accompanying drawings,

Fig. 1 is a plan view of a bottle feeder constructed in accordance with this invention;

Fig. 2 is a fragmentary detail view of the star wheel showing the manner of lining it with resilient material;

Fig. 3 is a fragmentary plan view of a modified form of bottle feeder of the single conveyor type; and Fig. 4 is a front elevation of the bottle feeder of Fig. 1.

In these drawings, 10 indicates a frame supporting a double track of flat top chains forming belt conveyors 11 and 12 for delivering bottles B to and from the star wheel 13 of a bottle filler or other bottle-handling mechanism, the conveyors being arranged alongside of each other and being movable in opposite directions. In the present instance, the star wheel forms an element of a combined filler and capper 14. The conveyors 11 and 12 travelling in the directions indicated by the arrows thereon conduct the bottles from the loading table of a washing machine or the like, not shown, to the filling machine and then return the bottles to or near such loading table to facilitate attention by a single operator.

A thin rotary feeding disk 15 closely overlies the ends of the conveyors 11 and 12 and projects underneath the star wheel 13 to move bottles between the conveyors and the star wheel. The feeding disk 15 is disposed to rotate in a substantially horizontal plane and is driven in any suitable manner in the direction indicated by the arrow. The bottles travelling on the incoming conveyor 11 are urged thereby onto the rotating feeding disk 15 which carries them towards the star wheel. Between the conveyors and extending obliquely across the incoming conveyor and above the feeding disk 15 is a deflector 16 which guides the bottles on the feeding disk into the notches 17 of the star wheel.

A yielding arcuate guard 18 is pivotally mounted at an intermediate portion on a spring-pressed yielding bolt 19 which is also pivotally mounted near its outer end on the frame 10. A toggle link 20 has pivotal connections at opposite ends with the guard 18 and with a slidably mounted spring-pressed bar 21. The spring for the bolt 19 is indicated as 22, while the spring for the bar 21 is indicated as 23. In addition the link 20 is under urge of a spring 24 to retain the guard 18 in its normal position adjacent the star wheel. Should a bottle become lodged between an advancing point of the star wheel and the inwardly projecting guard-connected end of the link 20, the guard 18 would yield and the link 20 would swing in such manner as to advance the bottle inwardly into the notch of the star wheel. On the other side of the star wheel is an adjustably mounted stationary guard 25, which in normal operation prevents the bottles from leaving the star wheel until they are at the region of discharge. The guards 18 and 25 are bridged by an intermediate guard section 26 which is pivotally connected to the guard 18, suitable stop means such as a screw 27 being provided at the pivotal connection to limit the relative angular movement of the connected guards. The movable guards 18 and 26 are thus retained in their proper normal position.

As the bottles are moved by the star wheel in a circular path in which they are normally confined by the guards 18, 25 and 26, they are urged onto the rotary feeding disk 15 which strips them from the star wheel and carries them around against the stationary deflector 16, which guides them onto the outgoing conveyor 12. In the present instance the bottles are urged off the conveyor 12 by a deflector 28 which guides them onto a collecting table 29 supported by the frame 10 laterally of the conveyor 12. The bottles are transferred from the disk to the outgoing conveyor adjacent the region of the disk where the bottles are transferred from the incoming conveyor to the disk, the deflector 16 guiding both the incoming and outgoing bottles.

The star wheel 13 in operation is given a quick intermittent rotation which tends to cause the bottles to be urged outwardly with some force resisted by the surrounding guards. At the point of discharge, however, this force might cause injury to or upsetting of the bottles and this is prevented by a shiftably mounted arcuate guard 30 which is slidably retained on and forms a continuation of the guard 25 and overlies the feeding disk 15 during the intervals at which the bottles are moved by the star wheel. During the pauses or dwells in the rotation of the star wheel the guard 30 is retracted to permit the release of the bottle from the star wheel by the feeding disk 15. This timed reciprocation of the shiftable guard 30 may be accomplished in any suitable manner. In the present instance the guard 30 includes a radially projecting arm 31 on which is pivotally mounted a link 32 retracted by a spring 33 and urged forwardly by means including a cam 34 which may be the same cam that effects the intermittent rotation of the star wheel.

In order to avoid possible breakage of bottles as they are introduced into the notches 17 of the star wheel, the notches are provided with a lining 35 of resilient material such as rubber, which is in turn covered with a strip 36 of thin flexible sheet metal held in place by screws 37 which may also serve to retain the rubber 35. In this manner the notches are provided with a resilient lining for cushioning the blows against the bottles and the rubber is protected from abrasion by means of the thin sheet metal covering without impairing the cushioning effect.

In the modified form of the invention shown in Fig. 3, a single conveyor chain 11' is employed to receive both the incoming and outgoing bottles in the same direction. The thin rotary feeding disk 15 closely overlies the conveyor 11' and underlies the star wheel 13 and is mounted to rotate in a substantially horizontal plane with its axis at the outer side of the conveyor. A deflector 16' overlies the feeding disk 15 to guide incoming bottles into the notches of the star wheel, and a deflector 16" is provided at the opposite side of the disk to guide outgoing bottles again onto the conveyor. The feeding disk is driven in the direction indicated by the arrow by any suitable means which may include a sprocket 38 meshing with and rotated by the conveyor chain.

The rotary feeding disk serves to insure accurate and positive feeding of the bottles without manual attention even when feeding single bottles at the end of a run, and the same feeding disk permits the transfer of bottles both to and from the rotating carrier or star wheel. The shiftable star wheel guard insures discharge of the bottles without danger of breakage or upsetting and the breakage of bottles is also avoided by the resilient lining of the star wheel notches.

The term "bottles" as herein used includes other equivalent containers such as cans and jars.

What we claim as new and desire to secure by Letters Patent is:

1. In a bottle-handling machine having an intermittently rotated star wheel, means for moving bottles into and out of said star wheel, guard means disposed adjacent the periphery of said star wheel for confining the bottles therein during the intermittent rotation of said star wheel, said guard means including a shiftable part adapted to prevent the discharge of a bottle during the rotation of said star wheel, and means for retracting said shiftable part to permit the discharge of a bottle during the dwell in the rotation of the star wheel.

2. In a bottle-handling machine having an intermittently rotated star wheel, means for moving bottles into and out of said star wheel, a guard disposed adjacent the periphery of said star wheel for confining the bottles therein during the intermittent rotation of said sar wheel, a shiftable guard member carried by said guard and adapted to prevent the discharge of a bottle during the rotation of said wheel, and means for retracting said shiftable guard member to permit discharge of a bottle during the dwell in the rotation of the star wheel.

3. A star wheel having bottle-receiving notches, a resilient lining carried in said notches, and a thin flexible sheathing covering and protecting said resilient lining.

4. A star wheel having bottle-receiving notches, a resilient rubber lining disposed in each notch, and a thin flexible metal sheathing covering and protecting said rubber lining.

5. In a bottle-handling machine having a star wheel rotatable on a substantially vertical axis and having bottle-receiving notches, a rotary feeding disk rotatable on a substantially vertical axis spaced from the axis of said star wheel and having peripheral portions underlying the notches of said star wheel for transferring bottles to and from said star wheel, and a bottle conveyor underlying said feeding disk at a region between the axes of said star wheel and said feeding disk and having incoming and outgoing portions cooperating with said disk.

6. In a bottle handling machine having a star wheel, a stationary arcuate bottle-confining guard member adjacent a portion of the periphery of said star wheel, and an articulated yieldingly mounted bottle-confining guard adjacent another portion of the periphery of said star wheel and extending to said stationary guard member, said articulated guard including pivotally joined guard members displaceable outwardly by a bottle travelling in the star wheel.

7. In a bottle handling machine having a star wheel, a stationary arcuate bottle-confining guard member adjacent one side of said star wheel, a yieldingly mounted arcuate bottle-confining guard member adjacent the opposite side of said star wheel, and guard means bridging the end portions of said stationary and yieldingly mounted guard members and forming with said latter guard member an articulated guard displaceable outwardly by a bottle travelling in said star wheel.

8. In a bottle handling machine having a star wheel, an incoming bottle conveyor, an oppositely movable outgoing bottle conveyor alongside of said first conveyor, a rotary feeding disk underlying said star wheel and having adjacent peripheral portions overlying the ends of said conveyors for transferring bottles from said incoming conveyor into the successive notches of said star wheel and for transferring bottles from said star wheel onto said outgoing conveyor, and a deflector overlying said feeding disk at a region separating the peripheral portions of said disk overlying said conveyors.

In testimony whereof we affix our signatures.

GEORGE J. MEYER.
OTTO DREHER.